US007426433B1

(12) United States Patent
Wear

(10) Patent No.: US 7,426,433 B1
(45) Date of Patent: Sep. 16, 2008

(54) METHOD AND SWITCH FOR CONTROLLING EXHAUST GAS TEMPERATURE

(75) Inventor: Michael Wear, Houston, TX (US)

(73) Assignee: Cold Fusion Nitrous Systems, LP, Houston, TX (US)

( * ) Notice: Subject to any disclaimer, the term of this patent is extended or adjusted under 35 U.S.C. 154(b) by 0 days.

(21) Appl. No.: 11/756,699

(22) Filed: Jun. 1, 2007

Related U.S. Application Data

(60) Provisional application No. 60/856,147, filed on Nov. 2, 2006.

(51) Int. Cl.
*F02S 41/04* (2006.01)
*G06F 19/00* (2006.01)

(52) U.S. Cl. ....................................... 701/103; 123/676

(58) Field of Classification Search ................. 701/102, 701/103, 104, 108, 114, 115; 123/478, 526, 123/527, 676
See application file for complete search history.

(56) References Cited

U.S. PATENT DOCUMENTS

| | | | | |
|---|---|---|---|---|
| 4,793,140 | A | 12/1988 | Esch | |
| 5,012,421 | A | 4/1991 | Ishii | |
| 5,600,948 | A | 2/1997 | Nakajima et al. | |
| 6,067,798 | A | 5/2000 | Okada et al. | |
| 6,434,476 | B1 * | 8/2002 | Zagone | 701/115 |
| 6,725,848 | B2 * | 4/2004 | Ramamurthy et al. | 123/568.22 |
| 6,857,264 | B2 * | 2/2005 | Ament | 60/284 |
| 6,879,904 | B2 * | 4/2005 | Muto et al. | 701/108 |
| 6,901,327 | B2 * | 5/2005 | Bidner et al. | 701/108 |
| 6,978,203 | B2 * | 12/2005 | Yasui et al. | 701/101 |
| 6,999,869 | B1 * | 2/2006 | Gitlin et al. | 701/115 |
| 7,055,506 | B2 | 6/2006 | Kaiser et al. | |
| 7,337,772 | B2 * | 3/2008 | Yasui et al. | 123/697 |

* cited by examiner

*Primary Examiner*—Willis R. Wolfe, Jr.
*Assistant Examiner*—Johnny H. Hoang
(74) *Attorney, Agent, or Firm*—Buskop Law Group, PC; Wendy Buskop

(57) ABSTRACT

A method for controlling exhaust gas temperature of a combustion engine comprising: setting predefined high and low exhaust temperatures; using at least one sensor to measure exhaust gas temperature; using computer instructions to instruct a processor to compare the measured temperature to the predefined high and low exhaust temperatures, determine a change between a first measured temperature and a second measured temperature over a small defined time interval, multiply the change by a factor that coincides with an internal lag time of the at least one sensor to provide a forecasted exhaust gas temperature, and control voltage to at least one accessory of the combustion engine to reduce the exhaust gas temperature when the forecasted exhaust gas temperature reaches or exceeds the predefined high exhaust temperature, or to increase the exhaust gas temperature when the forecasted exhaust gas temperature reaches the predefined low exhaust temperature.

17 Claims, 1 Drawing Sheet

METHOD AND SWITCH FOR CONTROLLING EXHAUST GAS TEMPERATURE

CROSS REFERENCE TO RELATED APPLICATION

The present application claims priority to U.S. Provisional Patent Application Ser. No. 60/865,147 filed on Nov. 9, 2006.

FIELD

The present embodiments relate to a method and an exhaust gas temperature switch for controlling exhaust gas temperature of a combustion engine.

BACKGROUND

A need exists for a method and switch to control the exhaust gas temperature of a combustion engine to maximize the power and performance of the combustion engine.

A further need exists for a method and switch to control the exhaust gas temperature of a combustion engine to produce maximum power while avoiding overheating and engine damage.

A need exists for a method and switch to monitor the exhaust gas temperature of a combustion engine and automatically stop or provide voltage to any accessory associated with the combustion engine when the engine is at risk of damage from overheating or when the combustion engine temperature is at risk of dropping below a normal operating temperature.

A need also exists for a method and switch to monitor and control exhaust gas temperature that accounts for small variations in temperature over time, sensor lag, and other factors, producing an accurate forecasted exhaust gas temperature continuously and in real time.

The present embodiments meet these needs.

BRIEF DESCRIPTION OF THE DRAWINGS

The detailed description will be better understood in conjunction with the accompanying drawings as follows.

Figure 1:
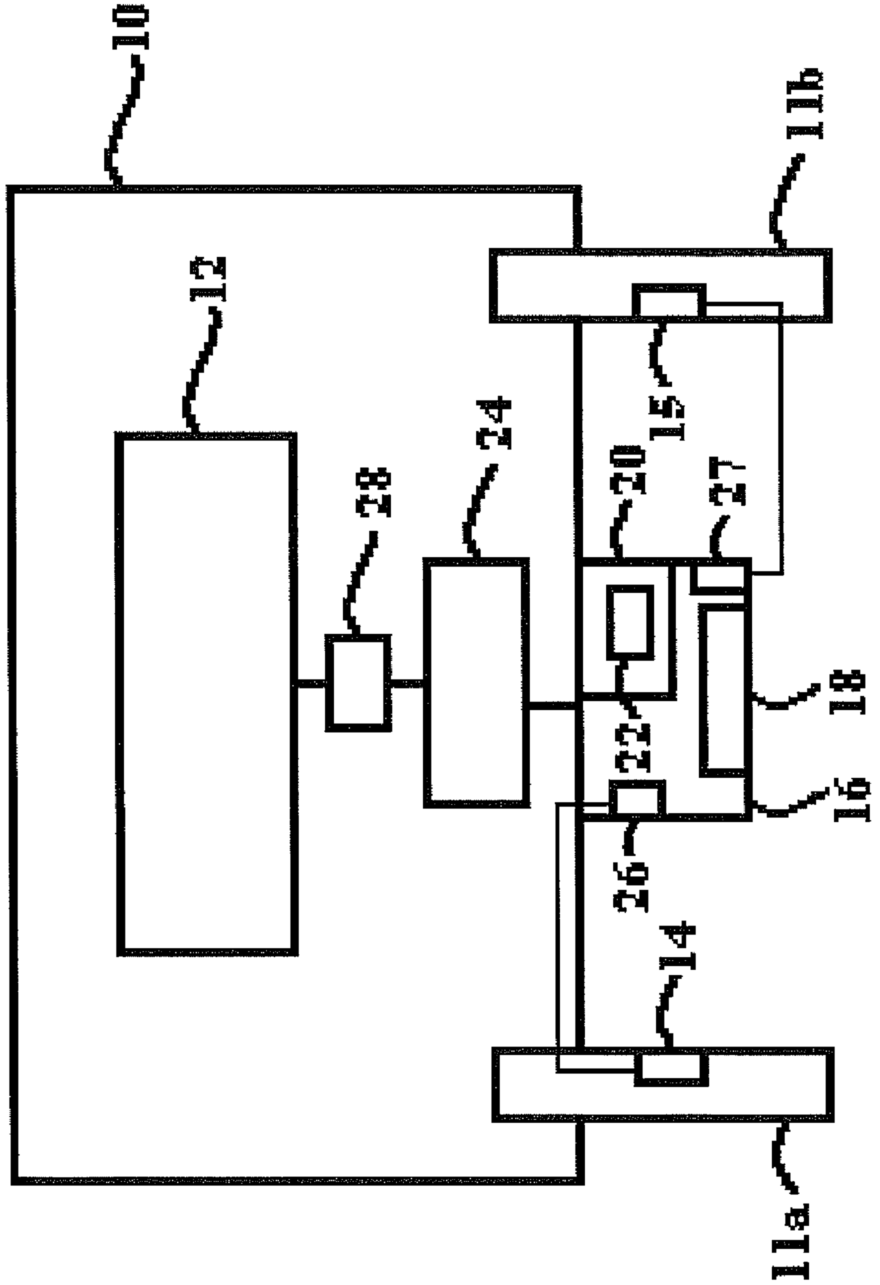
FIG. 1 depicts a diagram of an embodiment of the present exhaust gas temperature switch in operational communication with a combustion engine.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

One advantage of the present embodiments is that the present method and switch utilize real time data, calculated by multiplying instant temperature measurements that vary over a small time interval to account for sensor lag and other factors, to produce a highly accurate forecasted exhaust gas temperature. These accurate calculations provide continuous, real time temperature measurements and prevent engine overheating and related damage that could otherwise occur if only instant measurements that can be affected by sensor lag are used. This is a significant benefit, as an overheated engine can experience significant damage, requiring the entire motor to be rebuilt.

An additional advantage of the present method and switch is that the present method and switch use real time temperature measurements to automatically stop voltage or provide voltage to one or more engine accessories associated with a combustion engine. The one or more engine accessories can control the temperature of the combustion engine. As a result, the combustion engine can maintain maximum performance through use of one or more accessories, while voltage to the accessories is automatically controlled to maintain an engine temperature below that which will damage the engine, but above a normal operating temperature.

The automated voltage control feature allows owners of racing cars, snow mobiles, motorcycles, dirt bikes, jet skis, all terrain vehicles, personal aircraft, standard automobiles, and other daily use or special purpose vehicles to push their vehicles to the very limits of the vehicles' capabilities without risking damage caused by overheating of the combustion chamber in the combustion engine. Vehicle owners can continue to drive or race their vehicles without foregoing the extra horsepower achieved through use of a power adder or another accessory through use of the present embodiments.

A further advantage of the present method and switch is that the present switch is lightweight and small, weighing less than one pound. The present switch can therefore be shipped and transported extremely easily and inexpensively. The present switch can also be stored easily and can be contained in a housing that is easily stacked for added facilitation of storage.

The present switch is user friendly and easy to install, requiring no training or special instructions to install or use. A user can typically install the present switch in less than forty-five minutes to produce the maximum amount of horsepower from a combustion engine with a minimal chance of engine damage. Once installed, the switch can be very easily removed and installed on other vehicles.

The present embodiments relate to a method for controlling exhaust gas temperature of a combustion engine with at least one accessory to produce maximum engine power.

Combustion engines can include naturally aspirated engines, such as a small block Chevrolet engine, nitrous oxide assisted engines, such as an engine with a Cold Fusion Nitrous kit made by Cold Fusion Nitrous of Houston, Tex., turbo charged engines, such as a 911 turbo Porsche engine, super charged engines, such as a Ford Lightning engine, forced induction engines, such as a turbo diesel engine made by Ford, and other similar combustion engines.

Accessories can include power adders, such as a Nitrous Oxide Kit sold by Cold Fusion Nitrous of Houston, Tex., ignition timing mechanisms, such as MSD Ignition Control, fuel injectors, such as a fast fuel injection system made by Wilson, blow off valves for forced induction engines, such as a blow off valve made by B & M Racing Products, similar engine accessories, and combinations thereof. It is contemplated that a combustion engine can include any combination of accessories, each accessory can improve the power and performance of a combustion engine, and each accessory can increase or decrease the temperature of the combustion engine.

The present method includes setting a predefined high exhaust temperature that is just below a temperature that damages the combustion engine due to overheating. It is contemplated that the predefined high exhaust temperature can range from 1280 degrees Fahrenheit to 1400 degrees Fahrenheit for most engines, however some combustion engines may be able to withstand higher temperatures.

The present method further includes setting a predefined low exhaust temperature that is just above a normal combustion engine operating temperature. It is contemplated that the predefined low exhaust temperature can range from 500 degrees Fahrenheit and 1280 degrees Fahrenheit, however some combustion engines may have higher or lower normal operating temperatures.

The present method then includes operating the combustion engine, while using one or more sensors, such as ⅛th inch, K type, exhaust gas temperature probes made by Blaze Technical Services of Stow, Ohio, to measure the temperature of the exhaust gas flowing from the combustion engine, forming at least one measured temperature.

The present method then includes using a processor to receive each measured temperature of the exhaust gas. The processor can be a microcontroller, such as model number PIC 16 F 88, made by Micro Chips of Chandler, Ariz., for converting one or more measured temperatures.

It is contemplated that from one to sixty sensors can be associated with the combustion engine for measuring the exhaust gas temperature.

In an embodiment, one or more of the sensors can include a cold junction thermometer, such as part number max6675 made by MAXIM of Sunnyvale, Calif., located isothermal to the sensor for providing additional temperature information.

In another embodiment, the sensors can include at least two thermocouples, such as model number 050407 JF-125 made by Blaze Technical Services. It is contemplated that a first thermocouple can be positioned opposite at least one second thermocouple in an exhaust gas flow. The processor can receive a measured temperature from each thermocouple, convert each temperature to degrees Fahrenheit, and compare each converted temperature to the predefined high exhaust gas temperature, closing a switch to control voltage to one or more accessories when necessary to reduce or increase the exhaust gas temperature.

The processor can be directly connected to each sensor, or the processor can be in wireless communication with each sensor using a network, such as the internet, a local area network, a wide area network, a cellular network, a satellite network, other similar networks, or combinations thereof.

It is contemplated that one of the thermocouples can be located in each exhaust manifold of the combustion engine, and the thermocouples can be connected in parallel. The switch can be a relay, such as part number MIC 4428, made by Micrel Semiconductors, of San Jose, Calif.

The present method further includes using computer instructions in data storage in communication with the processor to instruct the processor to compare each measured temperature to the predefined high exhaust temperature and the predefined low exhaust temperature.

The computer instructions further instruct the processor to determine the change between a first measured temperature and a second measured temperature over a small defined time interval, such as 200 milliseconds.

The computer instructions then instruct the processor to multiply the change by a factor that coincides with a lag time of the sensors to provide a forecasted exhaust gas temperature in real time on a continuous basis. This step determines whether any additional degrees of temperature must be considered when predicting a future exhaust gas temperature, such as a few hundred milliseconds in the future, thereby ensuring prevention of damage to the combustion engine that can occur due to sensor time delay and other factors that can create inaccuracies.

When the forecasted exhaust gas temperature reaches the predefined high exhaust temperature, the computer instructions instruct the processor to control voltage availability to the one or more accessories associated with the combustion engine to reduce the temperature of the exhaust gas and prevent possible engine damage caused by overheating.

When the forecasted exhaust gas temperature reaches the predefined low exhaust temperature, the computer instructions instruct the processor to control voltage availability to the one or more accessories associated with the combustion engine to increase the temperature of the exhaust gas and maintain the combustion engine at a normal combustion engine operating temperature.

It is contemplated that the processor can be in direct communication with the data storage, or adapted to wirelessly communicate with a remote data storage, such as a server, using a network, such as the internet, a satellite network, a cellular network, other similar wireless networks, and combinations thereof.

In an embodiment, the processor can engage a circuit that includes a two set of standard two operation amperage 240 gain circuits that feed an analog to digital circuit to control voltage to the one or more accessories.

The present embodiments also relate to an exhaust gas temperature switch for controlling exhaust gas temperature of a combustion engine with at least one accessory to produce maximum engine power.

The present exhaust gas temperature switch includes at least one sensor to monitor the temperatures of exhaust gas flowing from the combustion engine. As described previously, the sensors can include thermocouples, cold junction thermometers, and can cause the processor to activate a switch, such as a relay, that controls voltage to the one or more accessories.

The present exhaust gas temperature switch further includes a processor, which can be a microcontroller, as described previously, to receive one or more measured temperatures of the exhaust gas.

The present exhaust gas temperature switch includes a temperature input device, such as a keyboard, a keypad, a touch screen, a mouse, a cellular telephone, a personal digital assistant, or any other device able to communicate with the processor and input or receive a selected temperature. The temperature input device is used to input a predefined high exhaust temperature just below a temperature that damages the combustion engine and a predefined low exhaust temperature just above a normal combustion engine operating temperature.

The present exhaust gas temperature switch can further include computer instructions in data storage in communication with the processor for instructing the processor to compare the measured temperatures to the predefined high exhaust temperature and the predefined low exhaust temperature.

The computer instructions can further instruct the processor to determine the change between a first measured temperature and a second measured temperature over a small defined time interval. If a change exists, the computer instructions can instruct the processor to multiply the change by a factor that coincides with a lag time of the one or more sensors to provide a forecasted exhaust gas temperature in real time on a continuous basis.

If the measured temperature exceeds the predefined high exhaust temperature, the computer instructions can instruct the processor to control voltage availability to the one or more accessories associated with the combustion engine to reduce the temperatures of the exhaust gas to prevent combustion engine damage.

If the measured temperature reaches the predefined low exhaust temperature, the computer instructions can instruct the processor to control voltage availability to the one or more accessories associated with the combustion engine to increase the temperatures of the exhaust gas to maintain the combustion engine at a normal combustion engine operating temperature.

In an embodiment the exhaust gas temperature switch can further include a circuit that includes a two set of standard two operation amperage 240 gain circuits engaging the processor that feed an analog to digital circuit to control voltage to the one or more accessories.

Referring now to FIG. 1, a diagram of an embodiment of the present exhaust gas temperature switch is depicted in operational communication with a combustion engine.

Combustion engine 10, which can be any type of engine for any type of vehicle, is shown having a first exhaust manifold 11*a* and a second exhaust manifold 11*b*. Combustion engine 10 has an accessory 12, which can be a power adder, an ignition timing mechanism, a fuel injector, a blow off valve, or other similar parts or accessories. While combustion engine 10 is depicted having a single accessory 12, combustion engine 10 can have any number and any combination of accessories.

A processor 16 having data storage 20 containing computer instructions 22 is shown disposed on combustion engine 10. Processor 16 can have a housing and can be attached to combustion engine 10 or any part of the vehicle containing combustion engine 10 using any kind of fastener, adhesive, or other means. Temperature input device 18, which can include a keypad or any other type of input device, and can include a graphical user interface, is depicted disposed on processor 16, for inputting predefined maximum and minimum exhaust gas temperatures.

A first sensor 14 is disposed in first exhaust gas manifold 11*a*. A second sensor 15 is disposed in second exhaust gas manifold 11*b*. First sensor 14 and second sensor 15 can be any kind of temperature sensor, including thermocouples. A first cold junction thermometer 26 is disposed in processor 16 and is in communication with first sensor 14. A second cold junction thermometer 27 is similarly disposed in processor 16 and in communication with second sensor 15.

Processor 16 is depicted engaging a circuit 24, which can be any combination of circuits for controlling voltage to accessory 12. It is contemplated that circuit 24 can be a two set of standard two operation amperage 240 gain circuits that feed an analog to digital circuit. Switch 28 is disposed between circuit 24 and accessory 12.

It is contemplated that a predefined maximum exhaust gas temperature can be received by processor 16 using temperature input device 18. As exhaust gas produced by combustion engine 10 and accessory 12 passes through first exhaust gas manifold 11*a* and second exhaust gas manifold 11*b*, first sensor 14 and second sensor 15 measure the exhaust gas temperature and communicate the measured temperature to processor 16.

Computer instructions 22 within data storage 20 in communication with processor 16 can then instruct processor 16 to compare measured temperatures from first sensor 14 and second sensor 15 with the predefined maximum exhaust gas temperature received by temperature input device 18. Computer instructions 22 can instruct processor 16 to manipulate the measured temperatures and perform calculations to determine whether processor 16 should be instructed to open or close switch 28, controlling voltage to accessory 12, thereby allowing the temperature of combustion engine 10 to avoid exceeding the predefined maximum exhaust gas temperature while producing maximum engine power. Computer instructions 22 can also instruct processor 16 to control voltage to accessory 12 in such a manner as to maintain the temperature of combustion engine 10 above the predefined minimum exhaust gas temperature.

While these embodiments have been described with emphasis on the embodiments, it should be understood that within the scope of the appended claims, the embodiments might be practiced other than as specifically described herein.

What is claimed is:

1. A method for controlling exhaust gas temperature of a combustion engine with at least one accessory to produce maximum power without causing damage to the combustion engine, comprising the steps of:

a. setting a predefined high exhaust temperature that is just below a temperature that damages the combustion engine;

b. setting a predefined low exhaust temperature that is just above a normal combustion engine operating temperature;

c. operating the combustion engine and using at least one sensor to measure at least one exhaust gas temperature from the combustion engine forming at least one measured temperature;

d. using a processor to receive the at least one measured temperature;

e. using computer instructions in data storage in communication with the processor to instruct the processor to perform the steps comprising:

i. comparing the at least one measured temperature to the predefined high exhaust temperature and the predefined low exhaust temperature;

ii. determining a change between a first measured temperature and a second measured temperature over a small defined time interval;

iii. multiplying the change by a factor that coincides with an internal lag time of the at least one sensor to provide a forecasted exhaust gas temperature in real time on a continuous basis;

iv. controlling voltage from a power source to the at least one accessory to reduce the exhaust gas temperature when the forecasted exhaust gas temperature reaches or exceeds the predefined high exhaust temperature; and v. controlling voltage from the power source to the at least one accessory to increase the exhaust gas temperature when the forecasted exhaust gas temperature reaches the predefined low exhaust temperature.

2. The method of claim 1, wherein the predefined low exhaust temperature is between 500 degrees Fahrenheit and 1280 degrees Fahrenheit.

3. The method of claim 1, wherein the predefined high exhaust temperature is between 1280 degrees Fahrenheit and 1400 degrees Fahrenheit.

4. The method of claim 1, wherein the at least one sensor comprises at least two thermocouples.

5. The method of claim 4, wherein the at least two thermocouples comprise: a first thermocouple positioned opposite at least a second thermocouple in an exhaust gas flow, and wherein the processor receives at least one measured temperature from each thermocouple, converts each measured temperature to degrees Fahrenheit, compares each converted measured temperature to the predefined high exhaust gas temperature, and closes a switch to control voltage to the at least one accessory.

6. The method of claim 5, wherein the at least two thermocouples are located in an exhaust manifold of the combustion engine, and the at least two thermocouples are connected in parallel.

7. The method of claim 5, wherein the switch is a relay.

8. An exhaust gas temperature switch for controlling exhaust gas temperature of a combustion engine with at least one accessory to produce maximum power without causing damage to the combustion engine comprising:

- a. at least one sensor to measure at least one exhaust gas temperature from the combustion engine forming at least one measured temperature;
- b. a processor to receive the at least one measured temperature;
- c. an input device for inputting to the processor a predefined high exhaust temperature that is just below a temperature that damages the combustion engine and a predefined low exhaust temperature that is just above a normal combustion engine operating temperature;
- d. computer instructions in data storage in communication with the processor, to instruct the processor to perform the steps comprising:
  - i. comparing the at least one measured temperature to the predefined high exhaust temperature and the predefined low exhaust temperature;
  - ii. determining a change between a first measured temperature and a second measured temperature over a small defined time interval;
  - iii. multiplying the change by a factor that coincides with an internal lag time of the at least one sensor to provide a forecasted exhaust gas temperature in real time on a continuous basis;
  - iv. controlling voltage from a power source to the at least one accessory to reduce the exhaust gas temperature when the forecasted exhaust gas temperature reaches or exceeds the predefined high exhaust temperature; and
  - v. controlling voltage from the power source to the at least one accessory to increase the exhaust gas temperature when the forecasted exhaust gas temperature reaches the predefined low exhaust temperature.

9. The exhaust gas temperature switch of claim 8, wherein the processor engages a circuit comprising a two set of standard two operated amperage 240 gain circuits that feed an analog to digital circuit to control voltage to the at least one accessory.

10. The exhaust gas temperature switch of claim 8, wherein the at least one sensor further comprises a cold junction thermometer located isothermal to the at least one sensor to provide additional temperature information to the processor.

11. The exhaust gas temperature switch of claim 8, wherein the processor is a microcontroller for converting the at least one measured temperature.

12. The exhaust gas temperature switch of claim 8, wherein the combustion engine is a naturally aspirated engine, a nitrous oxide assisted engine, a turbo charged engine, a super charged engine, a forced induction engine, or a diesel powered engine.

13. The exhaust gas temperature switch of claim 8, further comprising from one sensor to sixty sensors to monitor temperatures of exhaust gas flowing from the combustion engine.

14. The exhaust gas temperature switch of claim 8, wherein the at least one sensor comprises at least two thermocouples.

15. The exhaust gas temperature switch of claim 14, wherein the at least two thermocouples comprise: a first thermocouple positioned opposite at least a second thermocouple in an exhaust gas flow, and wherein the processor receives at least one measured temperature from each thermocouple, converts each measured temperature to degrees Fahrenheit, compares each converted measured temperature to the predefined high exhaust gas temperature, and closes a switch to control voltage to the at least one accessory.

16. The exhaust gas temperature switch of claim 14, wherein one of the at least two thermocouples are located in each exhaust manifold of the combustion engine.

17. The exhaust gas temperature switch of claim 15, wherein the switch is a relay.

* * * * *